United States Patent [19]
Cranston

[11] Patent Number: 5,389,244
[45] Date of Patent: Feb. 14, 1995

[54] PRESSURE AND VACUUM FILTRATION AND WASHING DEVICE

[76] Inventor: Michael T. Cranston, 161 Oak Ln., Greencastle, Pa. 17225

[21] Appl. No.: 78,836

[22] Filed: Jun. 21, 1993

[51] Int. Cl.$^6$ ...................... B01D 36/00; B01D 41/04
[52] U.S. Cl. .................................... 210/106; 210/111; 210/116; 210/137; 210/259; 210/416.1; 210/510.1
[58] Field of Search ............... 210/768, 769, 772, 106, 210/109, 111, 116, 117, 136, 137, 198.1, 209, 259, 510.1, 416.1

[56] References Cited

U.S. PATENT DOCUMENTS

| | | | |
|---|---|---|---|
| 4,018,899 | 4/1977 | Seckler et al. | 210/772 |
| 4,057,437 | 11/1977 | Kracklauer | 210/386 |
| 4,081,381 | 3/1978 | Rosenmund et al. | 210/408 |
| 4,250,032 | 2/1981 | Costa | 210/772 |
| 4,328,100 | 5/1982 | Moritz et al. | 210/304 |
| 4,402,834 | 9/1983 | Bastgen et al. | 210/772 |
| 4,592,835 | 6/1986 | Grieder et al. | 210/107 |
| 4,963,271 | 10/1990 | Raehse et al. | 210/772 |
| 5,209,855 | 5/1993 | Solaas | 210/259 |

*Primary Examiner*—Robert A. Dawson
*Assistant Examiner*—W. L. Walker
*Attorney, Agent, or Firm*—Arthur P. Gershman

[57] ABSTRACT

A pressure and vacuum filtration and washing device adapted for the processing and handling of hazardous materials without releasing hazardous chemical vapors includes a microporous filter medium which is contained within a pressurized filter vessel. A pump and static mixer, interconnected with the filter vessel by suitable piping means, allow circulation and reslurrying of the filter cake until the wash solvent is properly free of contaminants. The device any be operated under an inert atmosphere. A heated nitrogen gas cake drying means may be associated with the filter medium and contained within the filter. Automatic failsafe control valves are strategically disposed in the device, and the piping means, which interconnect the filter medium, the drying means, and the valves, are fabricated from materials compatible with the flow streams, such as teflon and borosilicate glass,. The device is totally enclosed and self contained, insuring complete operator isolation from hazardous chemicals. The device is used in the pilot plant stage of the chemical industry production life cycle. The filter medium may be a sintered glass, woven or non-woven metal, ceramic, or other microporous medium.

16 Claims, 2 Drawing Sheets

PRESSURE AND VACUUM FILTRATION AND WASHING DEVICE

The present invention relates to a filtration and washing method and apparatus, and more particularly to such a filtration and washing method and apparatus adapted for use in the processing of hazardous materials in the pilot plant operations stage of the product development cycle of the chemical industry.

BACKGROUND OF THE INVENTION

Product life cycle in the chemical industry starts in the laboratory and progresses through the pilot plant to large scale production. In the laboratory, handling of hazardous chemicals is done under a hood using appropriately designed ventilation systems to prevent or minimize operator exposure. Examples of such chemical fields in which hazardous materials are commonplace include pharmaceuticals, agricultural chemicals, and electronics. In large scale repetitive productions, engineering controls are designed and installed to achieve results similar to that produced in the laboratory.

However, pilot plant operations present a unique problem in this regard since vastly different products are routinely handled during the course of the year's development cycle. Flexibility in design and operation is necessary for a given level of investment in pilot plant equipment.

Traditionally, open, batch type nutsches were used in the pilot plant for solid-liquid separation. These open filters provided little protection for operators and very little emission control. Closed nutsches and other filter types were designed to overcome this problem but all contain inherent problems related to operator protection and/or emission control. Examples of such prior art filters are seen in the following:

| U.S. Pat. No. | Date | To | |
|---|---|---|---|
| 4,057,437 | 1977 | Kracklauer | directed to a belt filter |
| 4,081,381 | 1978 | Rosenmund et al | for a nutche filter |
| 4,328,100 | 1982 | Moritz et al | for a nutche filter |
| 4,592,835 | 1986 | Grieder et al | for a nutche filter |

In addition to these problems, the ability to thoroughly clean the equipment in between runs of different products, a necessary requirement of pilot plant operation, was inhibited with some of the prior art mechanical designs. Further, prior art filtration and washing apparatus for pilot plant equipment which requires handling of hazardous chemicals has generally been cumbersome, labor intensive, and otherwise expensive, due, in part, to the large number of and/or inefficient use of the design elements employed.

SUMMARY AND OBJECTS OF THE INVENTION

Accordingly, it is the primary object of the present invention to overcome the disadvantages of the prior art filters by providing a safe and convenient filtration and washing method and apparatus for pilot plant type production involving the processing of hazardous materials.

It is also an object of the present invention to provide such a filtration washing processor which is entirely self-contained, yet which is sufficiently flexible so as to be readily usable in demonstrating a wide variety chemical processes and the production of a wide variety of chemical products.

A further object of the present invention is the provision of a such a filtration washing processor which meets or exceeds occupational safety and environmental standards for the control of emissions.

An additional object of the invention is the provision of such a filtration washing processor in which emissions are reduced by a process which also increases the efficiency of the pilot plant operation.

Yet another object of the invention is to provide a filtration and washing method and apparatus for pilot plant type production involving the processing of hazardous materials. which is economically constructed and operated.

A further object of the invention is to provide a filtration washing processor with a reduced number of parts, which is labor-saving in operation, and which is sufficiently simple in design so as to be easy to operate.

Still another object of the invention is the provision of a such a filtration washing processor with carefully contained emissions which may be operated efficiently by a single operator with centralized controls and monitoring, thus reducing the chances of encountering difficulties in operation.

Yet another object of the invention is to provide a filtration and washing method and apparatus for pilot plant type production involving the processing of hazardous materials which is easily cleaned enabling efficient runs of successive chemical products and the pilot production of successive chemical products.

The above and other objects of the present invention which will become apparent hereinafter are achieved according to the invention by the provision of a filtration and washing device and method for pilot plant type production involving the processing of hazardous materials which is entirely self contained. Washing and separation of a solid product from a liquid stream takes place in a single vessel.

The device includes a microporous filter medium which is contained within a pressurized filter vessel. A pump and static mixer, interconnected with the filter vessel by suitable piping means, allow circulation and reslurrying of the filter cake until the solids are properly free of contaminants. The device may be operated under an inert atmosphere. A heated nitrogen gas cake drying means may be associated with the filter medium and contained within the filter. Automatic failsafe control valves are strategically disposed in the device, and the piping means, which interconnect the filter medium, the drying means, and the valves, are fabricated from materials compatible with the flow streams, such as teflon and borosilicate glass,. The device is totally enclosed and self contained, insuring complete operator isolation from hazardous chemicals.

These and other features, objects and advantages of the invention will become apparent upon consideration of the following detailed description wherein preferred embodiments of the invention are illustrated and described and the drawings in which:

DESCRIPTION OF THE PREFERRED EMBODIMENTS

Basic System Elements

Figure 1:
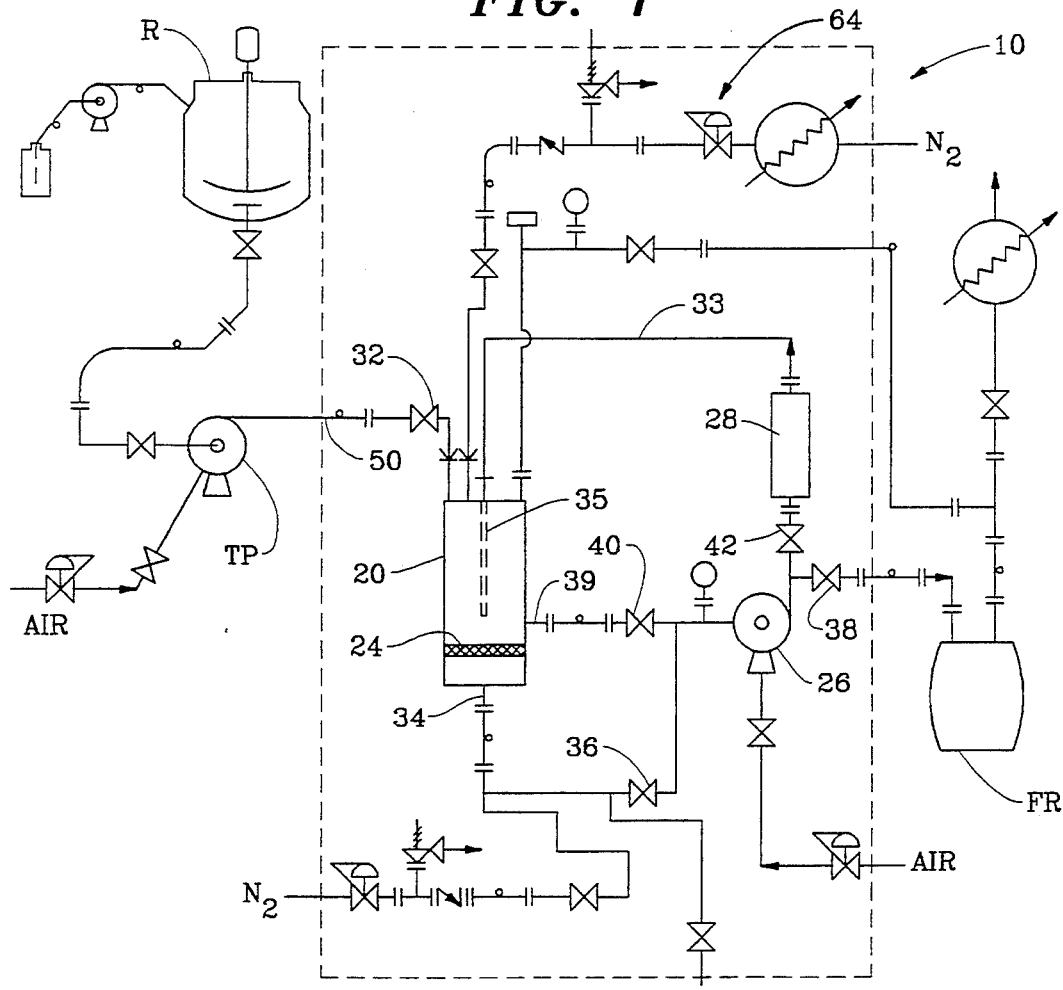
FIG. 1 is a schematic diagram illustrating the pilot plant method and filtration washing apparatus in accordance with the present invention, in which the elements of the self-contained processor device are contained within the dashed line of the illustration.

Referring now in detail to the drawings, there is illustrated in FIG. 1 a schematic representation of the pilot plant method and filtration washing apparatus in accordance with the present invention, in which the elements of the self-contained processor device are contained within the dashed line of the drawing figure and designated generally by reference numeral 10.

Figure 4:
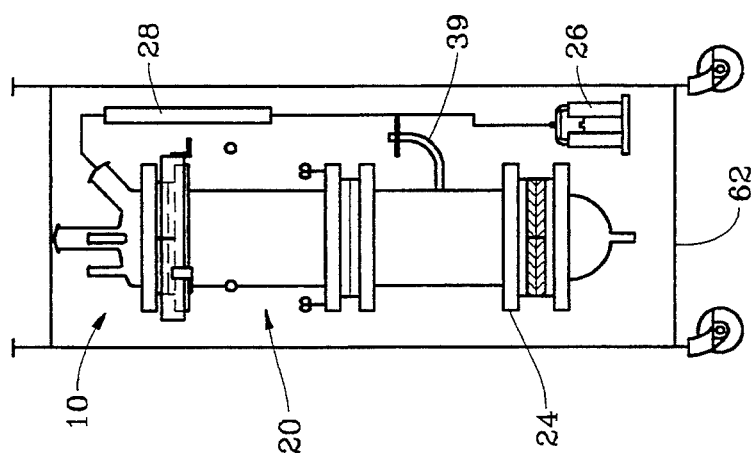
FIG. 4 is a side view, partially in section, of a self-contained filtration washing apparatus made in accordance with the present invention, illustrated in position on a cart provided for ease in handling the device of the invention.

Referring now to FIG. 4, with further reference to FIG. 1, there is illustrated a self-contained filtration washing device made in accordance with the present invention and including those elements contained within the dashed line of FIG. 1, the device similarly being designated generally by reference numeral 10. Device 10 include a filter vessel 20, which is self-enclosed, capable of pressurization (typically rated at 15-100 psi,) and made from a material compatible with hazardous and/or corrosive material flows, such as borosilicate glass, as manufactured by Schott Process Systems, Inc. of Vineland, N.J. Alternative materials include, but are not limited to PTFE, titanium, tantalum, and graphite. Filter vessel 20 is typically 6-48 inches in diameter and rated at 15 psi for glass and 100 psi for a metal lined structure.

In the preferred embodiment illustrated, filter vessel 20 is provided with a five port head cover, a pipe section supporting the head cover, an unequal tee with elbowed connection, a quick connect coupling interconnecting the tee and pipe section, a reducer, and filter means 24, to be described in detail hereinafter, clamped between the reducer and the tee. Further, in the preferred embodiment filter vessel 20 includes a support ring positioned between the head and the pipe section, all necessary bolts, couplings and gaskets needed to complete the unit, and may optionally include adapter spool pieces and adapter flanges, and handles for quick connect coupling, mounted to the vessel. It will of course be appreciated that any variety of pipes, tees, heads, etc. may compose filter vessel 20, consistent with the requirements set forth in the present specification.

Referring once again to FIG. 1, with further reference to FIG. 4, it will seen that filtration washer device 10 includes, in addition to filter means 24 and filter vessel 20, an in-line or static mixer 28 associated circulating pump 26. In-line mixer 28 is a static mixer used to wash the filter cake formed behind filter means 24 with intimate contact and may be of the type such as the Kenics model 058C-PGH-91 static mixer, available from Chemineer Inc. of Pittsburgh, Pa. This wash and the reslurry (described hereinafter) cycles are effectuated using circulation pump 26, which may be, for example, an air operated diaphragm pump such as the Wilden M-1 model pump, which is rated at 0-14 GPM, 125 psig max., these cycles being described in detail hereinafter. At this point it should be noted that in accordance with the invention, by resuspending the filter cake in the wash solvent, efficient use of the wash solvent, i.e., less wash solvent is required, and highly effective washing, i.e., removal of contaminants, is possible. Further, the entire apparatus is adapted to be operated under a pressurized, inert atmosphere, such as nitrogen, as illustrated in FIG. 1.

The Filter

Figure 3:
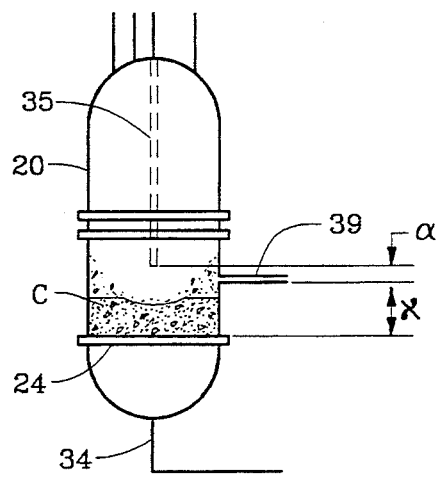
FIG. 3 is a schematic view, partially in section, of a preferred embodiment of a filter in accordance with the invention, illustrating the filtration method and apparatus for pilot plant production in accordance with the invention.

Referring now to FIG. 3, a detailed schematic view of the filter contained within filter vessel 20 will be used to illustrate and described a preferred filtration scheme in accordance with the present invention. The filtration methods employed in the present invention are in accordance with that known generally in the art, such as described in Solid-Liquid Separation, edited by L. Svarovsky and published by Butterworths Press, particularly at Chapters 13 and 17. In Chapter 13, batch vacuum filters, such as that of the present invention, are defined and described in detail. In Chapter 17 the rating and design of filter media is addressed in detail. Filter media suggested therein, which are also contemplated in the present invention, include natural, synthetic or glass, woven or non-woven cloth; paper, ceramic, cellulostic or synthetic membrane, or, in some cases, woven, etched or sintered metal, depending upon the requirements and/or allowable cost. In particular, filter means 24 is a microporous medium, capable of filtering particles having an average diameter on the order of greater than 1 micron. In the present preferred embodiment illustrated and described herein, filter means 24 contained by filter vessel 20 is a fritted or sintered glass plate taking the form of a disc, having a porosity which depends on system design factors such as the pressure within the filter vessel, filtration rate, the nature of the cake, filter durability, etc. Such fritted or sintered glass filter discs are commercially available in a variety of standard disc diameters, for example, from Ace Glass, Inc. of Vineland, N.J.

As is apparent from a review of FIG. 3, filter vessel 20, having a predetermined diameter and length, provides a chamber which, together with the position of the wash solvent outlet 39, limits the volume of filtration cake C permitted to accumulate behind filter means 24, both for total batch production and reslurrying purposes. This cake volume limitation determines the maximum pilot plant production for any given product or process run. Filter discs of sintered glass are available economically in standard sizes. Examples of pilot plant capacity using various standard filter plate discs are illustrated in the accompanying Table 1.

TABLE 1

| Filter dia. (in.) | Cake Capacity (cu. ft.) | Filter Area (sq. ft.) | Vol. (gals.) |
| --- | --- | --- | --- |
| 8 | 0.18 | 0.35 | 5 |
| 12 | 0.35 | 0.78 | 15 |
| 18 | 0.88 | 1.76 | 30 |
| 24 | 1.57 | 3.14 | 50 |

TABLE 1-continued

| Filter dia. (in.) | Cake Capacity (cu. ft.) | Filter Area (sq. ft.) | Vol. (gals.) |
|---|---|---|---|
| 36 | 3.53 | 7 | 100 |
| 48 | 6.28 | 12.75 | 200 |

From Table 1, it it is seen that economically feasible pilot plant capacity is available for an apparatus or process in which the filter cake volume ranges from about 5 gallons to about 200 gallons. Additionally, custom designs are possible and desirable, particularly with the use of woven metal filters, as described hereinbelow, which can be easily manufactured to any predetermined diameter and dimensions.

While the use of a fritted glass filter medium is described and illustrated herein as a preferred embodiment, is it also within the scope of the invention to employ any of the media described hereinabove for the filter means 24, dependent on the requirements of the pilot plant and the chemicals produced and handled therein. For example, a woven metal medium may be used instead of fritted glass. In this instance, an exotic-metal vessel would be appropriate, where required by the chemical products, handling media, or chemical byproducts of the pilot plant operation. Similarly, filter plate 24 could be any of those as described above in Chapter 17 of the Svarovky reference. In such instances a stainless steel vessel may be appropriate. Further, depending on the application, any combination of these vessel designs and filter may be used, together with the selection of an appropriate combination of teflon, all-metal, or other material valves, pumps, gaskets, piping, etc.

Reslurry and Wash Cycle

Referring once again to FIG. 1, the reslurry and wash cycles will now be described in detail. The product slurry, a solid-liquid stream, is pumped into filter vessel 20 through inlet line 50 via automatic valve 32. Filter cake C (see FIG. 3) is formed behind filter medium 24 while the mother liquor of the product slurry is removed from filter vessel 20 through outlet line 34 by diaphragm pump 26 via automatic valves 36, 38 to filtrate receiver FR. After all the mother liquor is pumped into filtrate receiver FR, the wash solvent contained in wash solvent bottle WS is then pumped into the apparatus through inlet line 50 via automatic valve 32. The wash solvent is circulated in a loop which includes filter vessel 20, pump 26 and static mixer 28 to reslurry the filter cake and wash the cake with intimate contact in the loop, via automatic valves 40, 42.

Further, within the circulation loop is dip tube or pipe 35 which extends from the wall of filter vessel 20 where it is connected to the line 33 carrying circulated wash solvent from static mixer 28 to vessel 20 to a predetermined point located a fixed distance away from filter medium 24 within vessel 20. Within the circulation loop, wash solvent is discharged at such a rate and proximity to the filter cake C that the filter cake is caused to become resuspended and then washed via intimate contact with the wash solvent through the static mixer until properly free of contaminants. The proximity of dip pipe 35 to the front face of the filter 24 is significant but variable and determined by experimentation with the particular process at hand. Typically, the end of the tube is located 6 to 10 inches from the top of the filter cake C, designated reference dimension α in FIG. 3, which is determined by the distance wash solvent outlet line 39 is located from the front face of filter 24, designated by reference dimension ≋ in FIG. 3. Typically, line 39 is located at the midpoint of the tee section of vessel 20. According to this resurrying technique the inventive filter apparatus promotes intimate contact between solid particles and wash solvent, which enables the apparatus to be completely self-contained in a compact unit.

When the wash solvent is spent, the spent solvent is removed to filtrate receiver FR via pump 26 and automatic valves 36, 38. Then, if necessary, fresh wash solvent, which may be chemically different or chemically identical to the initially added wash solvent, is once again pumped from bottle WS into vessel 20 and the cycle is repeated to remove trace contaminants from the cake. Generally at least two solvent cycles are necessary.

Piping, Valves, and Pumps

Interconnecting the major system elements described above are necessary piping or tubing lines. Each of the lines are designed for the particular filtrate, solvent, and/or chemical products handled, dependent on factors such as the filter medium and filter vessel employed. Typical piping materials include teflon, stainless steel, and exotic metals such as Hastalloy C, zirconium, inconel, and titanium.

Figure 2:
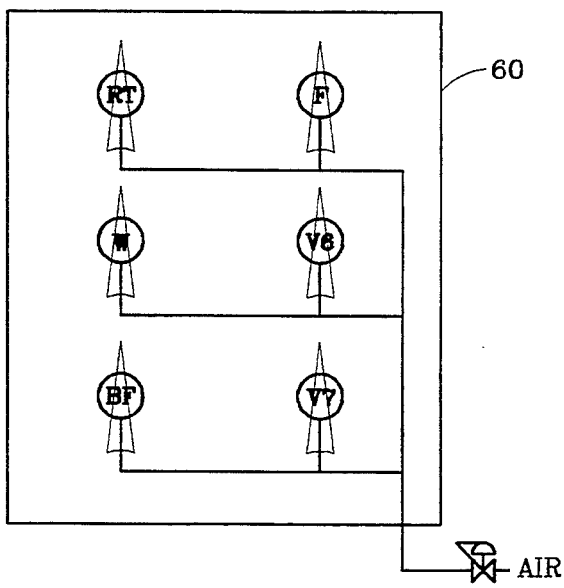
FIG. 2 is a schematic front view of the instrument panel of the device made in accordance with the present invention, illustrating the controls for the method and apparatus for filtration washing, in accordance with the invention.
Figure 5:
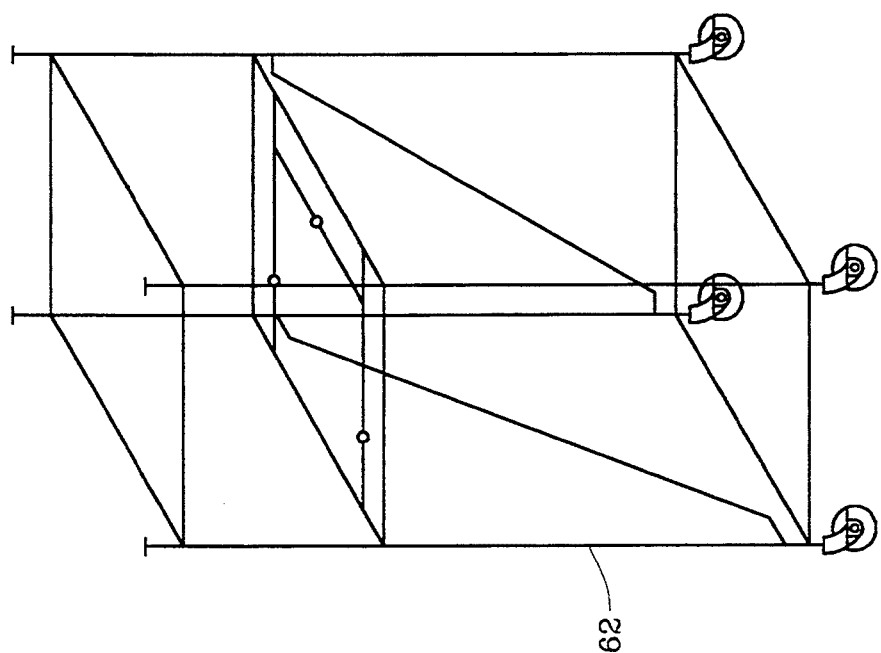
FIG. 5 is an isometric view of the cart illustrated in FIG. 4.

Controlling the flow of material through the apparatus are a number of valves, including pressure regulators, pressure relief valves, etc. This valving apparatus is similarly constructed so as to provide complete containment of and resistance to hazardous or corrosive chemicals which may be handled by the system. By way of example but not limitation, teflon valves rated for 50 psig at 149 degrees C may typically be used. Valve and valving apparatus used in the system are all electrically and/or pneumatically connected to control panel 60 (FIG. 2) which is mounted on one of the sides of cart 62 illustrated in FIGS. 4 and 5 to allow remote control of flow in the system, thereby protecting the apparatus operator from exposure to the hazardous chemical handled by the system. Automatic failsafe valves are a particular feature of the present apparatus.

Similarly, any pumps used in the system are constructed so as to provide complete containment of and resistance to hazardous or corrosive chemicals which may be handled by the system, and are connected to the control panel 60 for remote operation and operator protection. Specifically, in addition to details of circulation pump 26, which are described hereinabove, pump 26 is also provided as a transfer pump. In the embodiment illustrated in FIG. 1, transfer pump 26 may be any of a variety of pumps, desirably low-maintainence and providing a combination vacuum source and pump of materials such as teflon, stainless steel, or exotic metals.

Operation

In operation, the contents of reactor vessel R are pumped into the apparatus illustrated in FIG. 4, and shown schematically within the dashed line of FIG. 1, and more specifically, into filter vessel 20 through line 50. Filter cake C (FIG. 3) is built up at the filter 24 as the filtrate is removed through line 34 into filtrate receiver, FR, passing through valves 36 and 38. Once all the filtrate, or mother liquor, has been pumped into filtrate receiver FR, valves 36, 38, 40, and 42 are reset, and wash solvent in bottle WS is pumped by transfer pump TP through line 50 into vessel 20. At this point, the reslurry technique described hereinabove takes effect and promotes reslurrying of the cake into the wash solvent, which is circulated in the loop composed of line 39, valve 40, pump 26, valve 42, mixer 28, in which the reslurried cake is thoroughly mixed with the wash solvent, and line 33. This circulation takes place until the desired amount of washing has taken place, after which, the valves are reset, and the spent wash solvent is removed to the filtrate receiver FR. Additional wash cycles may be carried out, dependent on the demands of the particular pilot plant operation, e.g., purity of the chemicals involved. At this point the cake may be dried, as by the optionally provided heated nitrogen cake drying apparatus designated generally be reference numeral 64 of FIG. 1. In any event, once the filtration is complete, the bottom dish of the apparatus containing the filter cake is removed, preferably by use of optionally provided quick release clamps. The filter cake is then removed from the filter, and the entire apparatus, or any part of it, may be readily and thoroughly cleaned for subsequent pilot plant operation of the apparatus.

Additional Embodiment and Features

Figure 6:
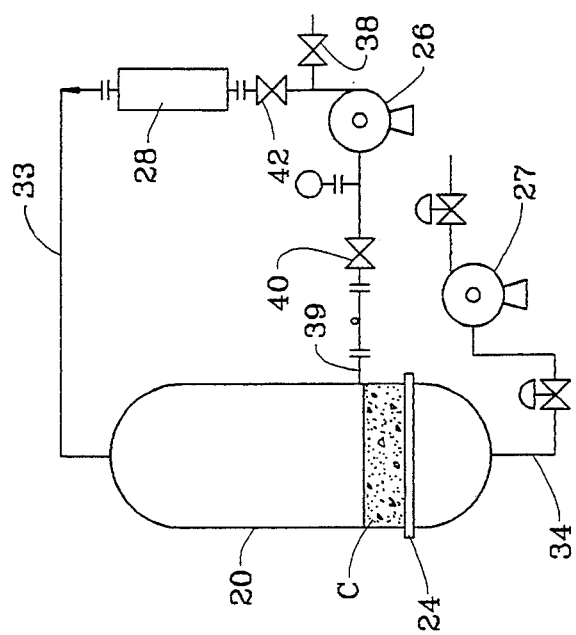
FIG. 6 is a diagram illustrating an alternative embodiment of the invention.

Referring now to FIG. 6, an additional embodiment is disclosed in which the liquid filtrate is the chemical compund of major interest as discussed hereinbelow. For example, when activated carbon is added to remove final traces of color, a second pump is used just to do the filtration step. In this case in addition to pump 26 in the circulation loop, an additional pump 27 is also used, as illustrated in the drawing Figure.

Since the filter of the first preferred embodiment targets the handling of hazardous chemicals, the filter is totally enclosed and completely inert, using, e.g., nitrogen, glass, and teflon. However, these features make the filter attractive to the electronics and food industries in situations which may not demand apparatus specific to the handling of hazardous chemicals. Accordingly, it is also intended to include these industries as end users of the inventive filter described herein.

Further, it should be noted that the described apparatus is extremely flexible in its use for a wide variety of pilot plant operations and is adapted to recovery of either the cake or the liquid filtrate, dependent on the nature of the pilot plant operation. For example, in the pharmaceutical industry, the pilot plant operation may be directed to the purification of a pharmaceutical compound, in which case the purified cake may be of major interest as the purified compound, while in the chemical industry, the pilot plant operation may be directed to clarifying a chemical product to a water-white state, in which case the filtrate is the compound of value.

For these reasons, inter alia, it will be appreciated that while preferred embodiment of the invention have been illustrated and described in detail herein, changes and additions may be had therein and thereto without departing from the spirit of the invention. Reference should, accordingly, be had to the appended claims in determining the true scope of the invention.

What is claimed is:

1. A pressure and vacuum filtration and washing device adapted for the processing and handling of hazardous materials without releasing hazardous chemical vapors. comprising:
   a microporous filter medium adapted to be operated under an inert atmosphere;
   a filter vessel containing said filter medium and adapted to contain said inert atmosphere;
   means for pumping a solid-liquid stream through said filter vessel wherein said solid-liquid stream is separated by said filter medium into a filter cake and a filtrate stream;
   a mixer for washing the cake;
   at least one control valve; and
   piping means interconnecting said filter vessel, said pumping means, said mixer, and said valve, wherein;
   said device is totally enclosed and self contained and wherein said piping means includes a dip tube contained within the filter vessel and connected at one end to the piping interconnecting the mixer and the filter vessel, wherein the other end of said dip tube extends a predetermined distance from a face of said filter medium.

2. The device of claim 1 wherein said microporous filter medium is a sintered glass.

3. The device of claim 2 wherein said filter vessel is fabricated from borosilicate glass.

4. The device of claim 1 wherein the other end of said dip tube is positioned at a distance with respect to said filter medium to produce reslurrying of said filter cake.

5. The device of claim 1 wherein said microporous filter medium is a woven metal.

6. The device of claim 1 wherein said microporous filter medium is a sintered metal.

7. The device of claim 1 wherein said microporous filter medium is a non-woven material.

8. The device of claim 1 wherein said microporous filter medium is a woven fabric.

9. The device of claim 1 further comprising an automatic failsafe means integrated with said piping means.

10. The device of claim 1 wherein said at least one control valve is a teflon, pneumatic control valve.

11. The device of claim 1 further comprising: a control panel connected to said at least one control valve for the remote operation of said device.

12. The device of claim 1 wherein said filter vessel is constructed of stainless steel with stainless steel components.

13. The device of claim 1 said filter vessel is constructed of exotic metal with exotic metal components.

14. The device of claim 1 further comprising a low maintenance, teflon combination vacuum source and transfer pump.

15. The device of claim 1 further comprising a low maintenance, stainless steel combination vacuum source and transfer pump.

16. The device of claim 1 further comprising a low maintenance, exotic metal combination vacuum source and transfer pump.

* * * * *